(12) United States Patent
Wang

(10) Patent No.: US 11,362,598 B2
(45) Date of Patent: Jun. 14, 2022

(54) POWER SUPPLY CIRCUIT AND PHOTOVOLTAIC POWER GENERATION SYSTEM COMPRISING SAME

(71) Applicant: MORNSUN GUANGZHOU SCIENCE & TECHNOLOGY CO., LTD., Guangdong (CN)

(72) Inventor: Baojun Wang, Guangdong (CN)

(73) Assignee: MORNSUN GUANGZHOU SCIENCE & TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/285,100

(22) PCT Filed: Nov. 20, 2019

(86) PCT No.: PCT/CN2019/119639
§ 371 (c)(1),
(2) Date: Apr. 14, 2021

(87) PCT Pub. No.: WO2020/119408
PCT Pub. Date: Jun. 18, 2020

(65) Prior Publication Data
US 2021/0351718 A1    Nov. 11, 2021

(30) Foreign Application Priority Data
Dec. 14, 2018  (CN) .......................... 201811533242.1

(51) Int. Cl.
*H02S 40/32* (2014.01)
*H02M 7/538* (2007.01)
*H02J 3/12* (2006.01)

(52) U.S. Cl.
CPC ............... *H02M 7/538* (2013.01); *H02J 3/12* (2013.01); *H02S 40/32* (2014.12); *H02J 2300/24* (2020.01)

(58) Field of Classification Search
CPC ......... H02J 2300/24; H02J 3/12; H02S 40/32; H02S 40/34; H02S 40/36; H02S 40/38; H02S 40/30; H02M 7/538
See application file for complete search history.

(56) References Cited

U.S. PATENT DOCUMENTS

| 2012/0025621 A1* | 2/2012 | Seymour ............. H01L 31/0504 307/81 |
| 2014/0070614 A1* | 3/2014 | Lo ........................... H02J 3/385 307/43 |

(Continued)

FOREIGN PATENT DOCUMENTS

| CN | 102299616 | 12/2011 |
| CN | 102437767 | 5/2012 |

(Continued)

OTHER PUBLICATIONS

"International Search Report (Form PCT/ISA/210) of PCT/CN2019/119639," dated Feb. 7, 2020, with English translation thereof, pp. 1-5.

*Primary Examiner* — Nguyen Tran
(74) *Attorney, Agent, or Firm* — JCIP Global Inc.

(57) ABSTRACT

A power supply circuit and a photovoltaic power generation system comprising same. The power supply circuit utilizes the condition that a voltage output by discharge of a capacitor is a direct-current voltage which decreases with time, a CCFL conversion circuit is connected behind the capacitor, the CCFL conversion circuit converts the input direct-current voltage which decreases which time into a sinusoidal alternating-current for output. Since the CCFL conversion circuit operates in an open-loop mode, a peak-to-peak value of the sinusoidal alternating-current output by the CCFL conversion circuit is in direct proportion to an operating voltage of the CCFL conversion circuit, the voltage decreases with time, that is, the peak-to-peak valve of the (Continued)

sinusoidal alternating-current output by the CCFL conversion circuit decreases with time, thus, an effective value of the sinusoidal alternating-current decreases with time, and an attenuated sinusoidal alternating-current voltage is obtained.

20 Claims, 3 Drawing Sheets

(56) References Cited

U.S. PATENT DOCUMENTS

2014/0313805 A1 10/2014 Wang
2019/0341858 A1* 11/2019 Zhong .................... H02J 3/381

FOREIGN PATENT DOCUMENTS

| CN | 202601387 | 12/2012 |
|----|-----------|---------|
| CN | 202601388 | 12/2012 |
| CN | 107086601 | 8/2017 |
| CN | 109660127 | 4/2019 |
| CN | 109742789 | 5/2019 |

* cited by examiner

POWER SUPPLY CIRCUIT AND PHOTOVOLTAIC POWER GENERATION SYSTEM COMPRISING SAME

CROSS-REFERENCE TO RELATED APPLICATION

This application is a 371 of international application of PCT application serial no. PCT/CN2019/119639, filed on Nov. 20, 2019, which claims the priority benefits of China application no. 201811533242.1, filed on Dec. 14, 2018. The entirety of each of the above-mentioned patent applications is hereby incorporated by reference herein and made a part of this specification.

BACKGROUND

Technical Field

The disclosure relates to a power supply circuit used in a photovoltaic power generation system, in particular to a power supply circuit for activating aging photovoltaic strings.

Description of Related Art

With the anticipated depletion of petrochemical energy and the environmental pollution it brings, the research and application of renewable clean energy are highly valued by countries all over the world. Specifically, wind power and photovoltaic power generation technology have become the popular research topics. Photovoltaic power generation is the abbreviation of solar power generation. The development and research of photovoltaic power generation in China started in the 1970s of the $20^{th}$ century and progress stably in the 1990s. In the 21 st century, more focus has been laid on the research of solar photovoltaic power generation. In 2000, China's photovoltaic technology has entered the stage of large-scale grid-connected power generation.

In the field of photovoltaic power generation, in 2005, SunPower in the United States first discovered and proposed the PID effect, the full name of PID in English is: Potential Induced Degradation, that is, the potential induced attenuation. When SunPower discovered the PID effect, it proposed that the photovoltaic components can be connected in series to form a higher system voltage (600V as adopted in the United States, 1000V as adopted in Europe). The components work at high voltage for a long time, and there is leakage current between the cover glass, encapsulation material, and frames. A large amount of charge accumulates on the surface of the cell, which deteriorates the passivation effect of the cell surface, resulting in a decrease in the fill factor (FF), short circuit current (Isc), and open circuit voltage (Voc), making the performance of components lower than the designed standard. SunPower calls this phenomenon the surface polarization effect, but this attenuation is reversible. Since then, engineering and technical practitioners in the photovoltaic industry have begun to attention to the research and discussion of PID.

Since 2012, component quality problems caused by PID have been raised frequently in photovoltaic power plants, and the PID phenomenon has thus received a lot of attention. In December of the same year, PV Evolution Labs (PVEL), an independent photovoltaic components testing laboratory in the United States, took the lead in conducting PID testing on five international primary-level components manufacturers. The above-mentioned companies include China Yingli Green Energy, JA Solar, Trina Solar, and Japan Kyocera and Solarworld in Germany.

Since then, more and more photovoltaic component manufacturers have increased their emphasis on PID. As of the second quarter of 2015, mainstream photovoltaic manufacturers in China and foreign countries, such as Panasonic, Canadian Solar, Jinneng, Renesas, Hanwha, and Zhongsheng Optoelectronics announced that their components have passed the PID test of a third-party manufacturer.

According to the introduction of the third-party testing agency, PID means that when the solar component forms a high-strength negative voltage with the ground, the resulting potential difference will not only cause damage to the solar cell or module, but also cause the problem of power generation efficiency degradation.

PID can affect the power generation capacity and total output power of the entire system. The severe effect caused by PID can directly reduce the investment yield of photovoltaic power plants. In recent years, PID has become one of the main reasons for international buyers to complain about the quality of domestic components.

The methods in the prior art to mitigate or avoid the PID effect are mainly as follows:

1. Component Grounding

If a negative bias is applied to the component (the cell voltage is negative with respect to the frame), the above accumulated negative charge can be discharged to the ground, and the cell performance can be restored. This is the polarization effect that the cell performance can be restored.

Based on the above analysis, in order to avoid polarization effects when the components are used in series, SunPower proposes that the components of the N-type front surface solar cell are configured in the manner of positive grounding, and the components of the P-type front surface cell are configured in the manner of negative grounding.

2. Enhance the Insulation and Waterproof Performance of the Components and Reduce the Leakage Current For example, packaging materials with better stability are adopted, no metal frame is adopted, the body resistance of the cell is increased, the thickness and characteristics of the passivation film are improved, and a barrier layer is added in the device.

3. Eliminate the Source of Ion Generation

Quartz glass, low-sodium glass, etc. are adopted.

4. The String Voltage is Reduced.

For small-scale projects, micro-inverters can be taken into consideration to reduce the string voltage, which is also the reason that Tesla advocates a family-based micro-grid photovoltaic system.

In addition, a China disclosure patent application with the publication number CN107086601A discloses a photovoltaic power generation system and a voltage compensation method. The patent application uses the pulse voltage output by the voltage compensation device to compensate for voltage for the photovoltaic string, thereby reversing the adverse effects caused by the PID effect. However, there is no specific implementation method for the voltage compensation device, and it is only proposed that the function of the voltage compensation device is to output pulse voltage. The pulse voltage given in the specific implementation includes three forms of pulse voltages, including square wave, triangle wave and trapezoidal wave. FIG. 5A in CN107086601A is inherently the same as FIG. 5C, which is because that in FIG. 5A, t1 and t2 are rising and falling edges, respectively, and it is impossible to achieve an ideal condition. Both the rise and fall are present for a short period of time, and which is the small waveform shown in FIG. 5C. The three kinds of pulse voltages AU/At change dramatically, which will cause the photovoltaic string to peel off and crack, and the service life will be decreased. Moreover, the pulse voltage directly acts on the photovoltaic string. Because it is difficult to use the photovoltaic string to achieve electromagnetic shielding, the impact caused by electromagnetic radiation on the environment is significant. As we all know, as shown in FIG. 5A, there are many harmonics. Although photovoltaic facilities are mostly installed in uninhabited areas, there is a great level of electromagnetic radiation, and the reflection of the ionosphere in the atmosphere still causes great electromagnetic environmental pollution. Besides, the cost of obtaining these three waveforms is not low.

SUMMARY

In view of this, the technical problem to be solved by the disclosure is to provide a power supply circuit and a photovoltaic power generation system including the power supply circuit. The output voltage of the power supply circuit has a small change in AU/At, so the photovoltaic power generation system using the power supply circuit is environmentally friendly and causes less pollution.

In order to solve the technical problems, the technical solutions provided by the disclosure are as follows:

A power supply circuit applied to a photovoltaic power generation system,

The power supply circuit includes a switch K1, a current-limiting device, a capacitor C1, a switch K2, and a CCFL conversion circuit. One end of switch K1 is the positive input terminal of the power supply circuit, the other end of switch K1 is connected to one end of the current-limiting device, and the other end of the current-limiting device is simultaneously connected to one end of the capacitor C1 and one end of the switch K2. The other end of the capacitor C1 is the negative input terminal of the power supply circuit, the positive input terminal of the CCFL conversion circuit is connected to the other end of the switch K2, and the negative input terminal of the CCFL conversion circuit is connected to the negative input terminal of the power supply circuit. The first output terminal of the CCFL conversion circuit is the first output terminal of the power supply circuit, and the second output terminal of the CCFL conversion circuit is the second output terminal of the power supply circuit.

When the photovoltaic string is activated, the switch K1 is opened before the switch K2, and the capacitor C1 is used to provide the operating voltage for the CCFL conversion circuit.

In a specific implementation method of the current-limiting device, it is characterized in that: the current-limiting device is an inductor or a resistor.

Preferably, the capacitor C1 is a super capacitor or an electrolytic capacitor.

Preferably, the CCFL conversion circuit is driven externally (external pulse).

In a specific implementation method of the CCFL conversion circuit, the CCFL conversion circuit at least includes a startup circuit, an inductor L2, a capacitor C3, a triode TR1, a triode TR2, a transformer B, primary windings $N_{P1}$ and $N_{P2}$, feedback windings $N_{B1}$ and $N_{B2}$, and a secondary winding $N_{S1}$. The startup circuit at least includes two terminals, a startup input terminal and a startup output terminal. The startup input terminal is connected to the other end of the switch K2, and the startup output terminal is connected to the center taps of the feedback windings $N_{B1}$ and $N_{B2}$; the emitters of the triodes TR1 and TR2 are both connected to the other end of the capacitor C1. The collectors are connected to the two terminals of the primary windings $N_{P1}$ and $N_{P2}$, the collectors are also respectively connected to the two terminals of the capacitor C3, and the bases are respectively connected to the two terminals of the feedback windings $N_{B1}$ and $N_{B2}$. The center taps of the primary windings $N_{P1}$ and $N_{P2}$ are connected to the other terminal of the switch K2 through the inductor L2. One end of the secondary winding $N_{S1}$ is the first output terminal of the CCFL conversion circuit, and the other end of the secondary winding $N_{S1}$ is the second output terminal of the CCFL conversion circuit.

Preferably, the startup circuit includes a current supply device, and the current supply device is a resistor or a constant current source device.

Further, the startup circuit further includes a capacitor C2, which is connected in parallel with the current supply device, or the capacitor C2 is connected to the startup output terminal and the other end of the capacitor C1.

Correspondingly, the disclosure further provides a photovoltaic power generation system, the technical solution is as follows:

A photovoltaic power generation system, including a photovoltaic string and the power supply circuit according to any one of claims 1 to 7, the hot end of the photovoltaic string is electrically connected to the first output terminal of the power supply circuit, and the ground terminal of the photovoltaic string is electrically connected the second output terminal of the power supply circuit.

Further, the photovoltaic power generation system further includes a DC power supply, and the DC power supply is connected in series with the output terminal of the power supply circuit, and the series connection method is one of the following two:

(1) The negative pole of the DC power supply is electrically connected to the second output terminal of the power supply circuit, the first output terminal of the power supply circuit is electrically connected to the positive pole of the photovoltaic string, and the negative pole of the photovoltaic string is electrically connected to the positive pole of the DC power supply.

(2) The negative pole of the DC power supply is electrically connected to the positive pole of the photovoltaic string, the negative pole of the photovoltaic string is electrically connected to the second output terminal of the power supply circuit, and the first output terminal of the power supply circuit is electrically connected to the positive pole of the DC power supply.

Preferably, the peak value of the high-frequency alternating current output by the CCFL conversion circuit is not greater than the open circuit voltage of the activated photovoltaic string.

Regarding the technical terms involved in this disclosure, a variety of terms may be adopted in the disclosure and prior art. The technical terms in the following description have the same meaning, and the contents listed in the description are not exhaustive.

(1) Solar cell panels. In many documents, multiple single solar cell panels connected in parallel or in series are also referred to as solar cell panels, or photovoltaic strings, or even photovoltaic panel sets.

(2) The hot end of the photovoltaic string, because of the different preferences of different manufacturers, some ground the positive pole of the photovoltaic string, some ground the negative pole of the photovoltaic string, and the hot end refers to the terminal that is not grounded because it is not grounded. The hot end can easily cause electric shock to human body and therefore is called as the hot end, which is usually the end of the solar cell panel that needs to be activated, which may be the positive or negative pole of the photovoltaic string.

(3) The grounding terminal of the photovoltaic string, the grounding metal frame of the photovoltaic string; as mentioned above, it may be the negative pole or the positive pole of the photovoltaic string.

(4) Collector resonance type Royer circuit, or "CCFL inverter", so it is also referred to as CCFL inverter, CCFL converter, and CCFL conversion circuit. CCFL is the abbreviation of "Cold cathode fluorescent lamps", which initially refers to cold cathode fluorescent lamps. Before white LEDs was developed, they were mostly used as the backlight source of liquid crystal displays. Since the liquid crystal displays in the past were mostly used in notebook computers, the backlight source were all DC power supply. Under the circumstances, a variant of the Royer circuit was invented, turning DC into pure AC and driving cold cathode fluorescent lamps. The classic Royer circuit uses the saturation characteristics of the magnetic core to oscillate, and the output is a square wave. Please refer to the China patent document No. 201110436259.7 for detailed description. The characteristics of the CCFL conversion circuit are: in the Royer circuit, an inductor is connected in series from the middle tap of the primary winding of the push-pull transformer to the power supply end. This inductor is typically called a damping inductor $L_{LC}$ in the industry (corresponding to the inductor L2 in FIG. 1 of this disclosure). Generally it has inductance ten times or more the inductance of the primary winding. At the same time, a capacitor CL (corresponding to the capacitor C3 in FIG. 1 of this disclosure) is connected between the two collectors of the push-pull triode. This capacitor and the push-pull transformer form a known LC oscillating circuit, and the capacitance is CL, and L is the total inductance of the primary winding of the push-pull transformer. The total inductance of the push-pull transformer is four times the inductance of the primary winding 1 or 2. The output is a sinusoidal wave or an approximate sinusoidal wave. If a square wave is output, there will be electromagnetic pollution to the environment due to a high content of harmonic components. The CCFL conversion circuit is in the patent file with the China application number 201110242377.4, and FIG. 3 and the corresponding background technology in this file are also described in details.

With regard to the following technical terms, the meaning carried by the terms in this disclosure are as follows:

(1) Push-pull triode: Two triodes that realize Royer circuit and CCFL conversion circuit self-oscillation and work stably. The push-pull triode is typically two triodes, also called pair tubes, and also called push-pull triodes, which are typically bipolar semiconductors. Of course, it can also be a unipolar field effect transistor.

(2) Startup circuit: A circuit that provides a startup current or voltage for the push-pull triode or field effect transistor in the CCFL conversion circuit to realize the fast start or soft start of the CCFL conversion circuit.

The operating principle of the disclosure will be analyzed in specific embodiments, and no further details are incorporated herein.

The beneficial effects of the power supply circuit of the disclosure are:

(1) The voltage waveform AU/At output by the power supply circuit is small, so that the service life of the photovoltaic string in the photovoltaic power generation system using the power supply circuit is prolonged, and the radiation to the environment is small.

(2) The circuit is simple to realize, low in cost, high in reliability, and low in energy consumption.

DESCRIPTION OF THE EMBODIMENTS

Figure 1:
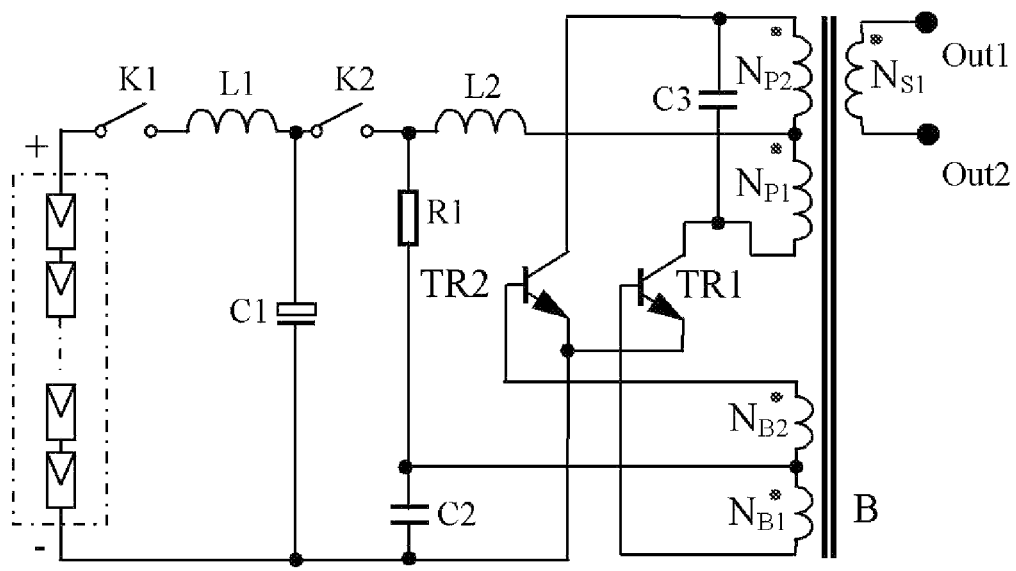
FIG. 1 is a schematic diagram showing the principle of a power supply circuit according to a first embodiment of the disclosure.

The photovoltaic power generation system mainly operates during the day when there is good sunlight. The local solar altitude angle reaches the maximum at 12 o'clock local time. In the time interval between 10:00 and 14:00 local time, the photovoltaic power generation system can effectively output electrical energy. Before 10:00 or after 14:00 local time, the power generation power is reduced, and thus the photovoltaic power generation system has no practical value during the above-mentioned time periods. The output characteristics of photovoltaic strings are not constant voltage sources, but largely similar to the characteristics of constant current sources. In order to obtain greater output power, the principle of maximum power output is adopted as much as possible to ensure that the output terminal voltage is as high as possible under the condition that the system efficiency is ensured. The output voltage curve at both ends of the photovoltaic string is that it rises rapidly in the morning, because the load is almost no-load, and when it is connected to the grid, it drops first due to load. The output voltage curve reaches the maximum value at noon when the sunlight is harshest, and then drops slowly. When the grid is off at around 14:00 local time, the voltage rises again to the open circuit voltage under the corresponding illuminance due to the reduction of the load, and then decreases with time until it is close to zero at night. In a rainy day, the voltage of the photovoltaic string is close to zero voltage throughout the day.

The idea of the disclosure is to provide a power supply circuit that uses a capacitor to discharge the output voltage as a DC voltage that decreases with time. A CCFL conversion circuit is connected behind the capacitor. The CCFL conversion circuit converts the input DC voltage that decreases with time into a sinusoidal AC output. Since the CCFL conversion circuit operates in an open-loop mode, a peak-to-peak value of the sinusoidal AC output by the CCFL conversion circuit is in direct proportion to an operating voltage of the CCFL conversion circuit. The voltage decreases with time, that is, the peak-to-peak valve of the sinusoidal AC output by the CCFL conversion circuit decreases with time. Thus, an effective value of the sinusoidal AC decreases with time, and an attenuated sinusoidal AC voltage is obtained. The attenuated sinusoidal AC voltage acts on both ends of an activated photovoltaic string, so that a voltage waveform AU/At output by the power supply circuit is small. The sinusoidal wave has a single frequency, it has less harmonic components and less air radiation, which is very friendly to the environment, thus the service life of the photovoltaic string in the photovoltaic power generation system using the power supply circuit is prolonged, the radiation to the environment is small, and the power supply circuit is simple to implement and low in cost.

In order to make it easier for those skilled in the art to understand the disclosure, the disclosure will be described below in conjunction with specific embodiments.

The First Embodiment

Please refer to FIG. 1, FIG. 1 is a schematic diagram showing the principle of a power supply circuit according to a first embodiment of the disclosure. The configuration of components and connection relations are as follows:

The power supply circuit shown in FIG. 1 includes a switch K1, an inductor L1, a capacitor C1, a switch K2, and a CCFL conversion circuit.

One end of the switch K1 is the positive input terminal of the power supply circuit, the other end of the switch K1 is connected to one end of the inductor L1. The other end of the inductor L1 is simultaneously connected to one end of the capacitor C1 and one end of the switch K2, and the other end of the capacitor C1 is the negative input terminal of the power supply circuit. The positive input terminal of the CCFL conversion circuit is connected to the other end of the switch K2, the negative input terminal of the CCFL conversion circuit is connected to the negative input terminal of the power supply circuit. The first output terminal of the CCFL conversion circuit is the first output terminal of the power supply circuit. The second output terminal of the CCFL conversion circuit is the second output terminal of the power supply circuit.

The CCFL conversion circuit of this embodiment includes a startup circuit composed of a resistor R1 and a capacitor C2, a capacitor C3, an inductor L2, a triode TR1, a triode TR2, a transformer B, primary windings $N_{P1}$ and $N_{P2}$, feedback windings $N_{B1}$ and $N_{B1}$, and a secondary winding $N_{S1}$. The startup circuit at least includes two terminals. One end of the resistor R1 is the start input terminal, and the connection point between the other end of the resistor R2 and one end of the capacitor C2 is the start output terminal. In this embodiment, the device that provides the startup current for the two push-pull triodes TR1 and TR2 is the resistor R1.

The connection relationship of the CCFL conversion circuit is: the start input terminal is connected to the other end of the switch K2, the start output terminal is connected to the center taps of the feedback windings $N_{B1}$ and $N_{B2}$. The other end of the capacitor C2 is connected to the other end of the capacitor C1. The emitters of the triodes TR1 and TR2 both are connected to the other end of the capacitor CL. The collectors of the triodes TR1 and TR2 are respectively connected to the two terminals of the primary windings $N_{P1}$ and $N_{P2}$. The collectors of the triodes TR1 and TR2 are also respectively connected to the two terminals of the capacitor C3, the bases of the triodes TR1 and TR2 are respectively connected to the two terminals of the feedback windings $N_{B1}$ and $N_{B2}$. The center taps of the primary windings $N_{P1}$ and $N_{P2}$ are connected to the other end of the switch K2 through the inductor L2. One end of the secondary winding $N_{S1}$ is the first output terminal of the CCFL conversion circuit, the other end of the secondary winding $N_{S1}$ is the second output terminal of the CCFL conversion circuit.

The capacitor C1 of the disclosure is preferably a super capacitor or a large electrolytic capacitor with small leakage current, which is obtained through series and parallel connection.

Since the output of the CCFL conversion circuit is alternating current, the first output terminal and the second output terminal of the power supply circuit of the disclosure can be exchanged.

In order to overcome the defects of pulse voltage in the prior art, the voltage applied to activate the photovoltaic string in this disclosure is sinusoidal alternating current, and the acquisition of alternating current is very complicated. If a switching power supply is used to obtain alternating current directly, the waveform edge of the output voltage is very steep, for example, the voltage waveform output by the push-pull converter is a square wave, and its AU/At is close to infinity, so there are also the defects described in the background art. If the digital audio power amplifier is adopted, in the cases that the switching power supply plus the output filter, the cost and control circuit are very complicated.

The circuit for obtaining sinusoidal alternating current in this embodiment adopts a CCFL conversion circuit. Furthermore, given that the wavelength of the 1 MHz high-frequency alternating current is 30 meters, the length of the corresponding half-wave dipole antenna is ¼ wavelength, which is 7.5 meters. That is, the frequency of the high-frequency alternating current output by the power supply circuit of the disclosure is below 1 MHz. In that case, the radiation of the high-frequency alternating current is relatively easy to control. For example, the high-frequency alternating current that is output has the frequency of 100 KHz, ¼ wavelength is 75 meters, with respect to the wiring far below 75 meters, the radiation efficiency is very low. Therefore, this embodiment requires the CCFL conversion circuit to operate at a relatively "low frequency" below 1 MHz, which is still referred to as high-frequency alternating current or sinusoidal alternating current in the disclosure.

Figure 2:
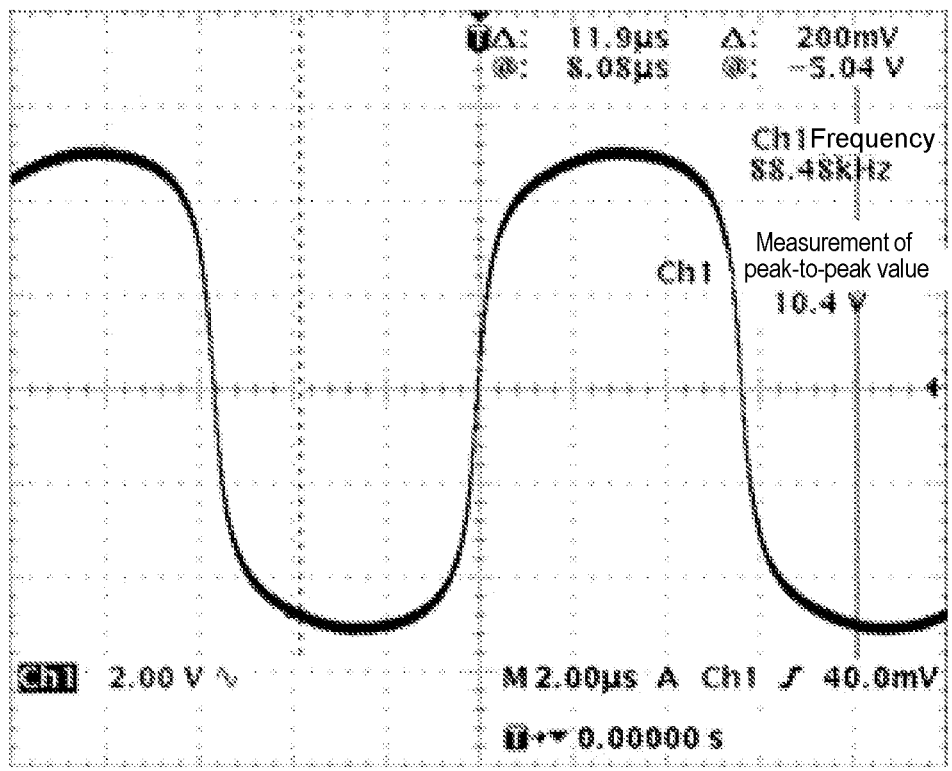
FIG. 2 is a diagram of the voltage waveform output when the CCFL conversion circuit in the power supply circuit of the first embodiment of the disclosure operates alone.

The CCFL conversion circuit is a kind of self-excited push-pull converter. The working principle of its realization of sinusoidal output voltage waveform is analyzed as follows:

Refer to the circuit on the right side of the capacitor C1 in FIG. 1, the circuit is the CCFL conversion circuit. The difference between the CCFL conversion circuit and the self-excited push-pull converter is the addition of a capacitor C3 and an inductor L2. The principle of oscillation of circuit is similar to the self-excited push-pull converter, but the CCFL conversion circuit does not use the magnetic core saturation characteristics for push-pull oscillation, but uses the capacitor C3 and the total inductance of the windings $N_{P1}$ and NP of the coupling transformer B to perform the LC loop oscillation. The output waveform of the circuit is a sinusoidal wave, and is no longer a square wave. The function of the inductor L2 is: 1. Provide a larger AC input impedance for the transformer; 2. Ensure that a perfect sinusoidal wave is output. The voltage waveform that is output when the CCFL conversion circuit operates independently is shown in FIG. 2. FIG. 2 is not perfect and simply serves as an example herein. If L2 is further enlarged, the waveform distortion THD in FIG. 2 will be less than 10%, which is practical under this circumstances. This type of oscillation has strict requirements on the value of the device.

The smaller the waveform distortion THD of FIG. 2 is, the lower the energy consumption of the power supply circuit of the disclosure.

The characteristics of the CCFL conversion circuit are: using the LC series resonance circuit to oscillate, the frequency is relatively stable, the output is a sinusoidal wave or an approximate sinusoidal wave, and the efficiency is low. Therefore, it is also necessary to string an inductor L2 in the power supply circuit to improve the efficiency.

The disclosure requires that the inductance of the inductor L2 is more than 10 times or more the inductance of the windings $N_{P1}$ or $N_{P2}$. Under the circumstances, it is possible for the inductor L2 and the capacitor C3 to oscillate the sinusoidal wave.

Since the operating voltage of the CCFL conversion circuit is the terminal voltage of the capacitor C1, the positive half-cycle peak value of the high-frequency alternating current output by the CCFL conversion circuit is connected to form an envelope. The shape of the envelope will be similar to the change of the terminal voltage of C1. Similarly, the negative half-cycle peak value of the high-frequency alternating current output by the CCFL conversion circuit is connected to form an envelope, the shape of the envelope after mirroring the X-axis in the common coordinates will be similar to the change in the terminal voltage of C1.

In the disclosure, when the photovoltaic string needs to be activated, for the external power supply that supplies power to the power supply circuit of the disclosure, which can be a battery or a rectified direct current from the mains, the switch K1 is first closed to charge the capacitor C1, then the switch K1 is opened, and the switch K2 is closed. The capacitor C1 is adopted to discharge gradually, that is, the photovoltaic string supplies the activation voltage.

In order to improve the efficiency of the photovoltaic power station, the optimal activation plan is to use the photovoltaic string itself as an external power source when the grid-connected power generation at two o'clock in the afternoon loses its value. The switch K1 is closed, the capacitor C1 is charged. After sunset, the switch K1 is opened, and the switch K2 is closed. The gradual attenuation of the voltage at the gradual discharge terminal of the capacitor C1 is adopted to provide a gradually attenuated operating voltage for the CCFL conversion circuit. The output terminal of the CCFL conversion circuit obtains an attenuated sinusoidal AC voltage, which acts on both ends of the activated photovoltaic string. If activation is not enough, only the capacity of capacitor C1 needs to be increased, and vice versa.

Figure 3:
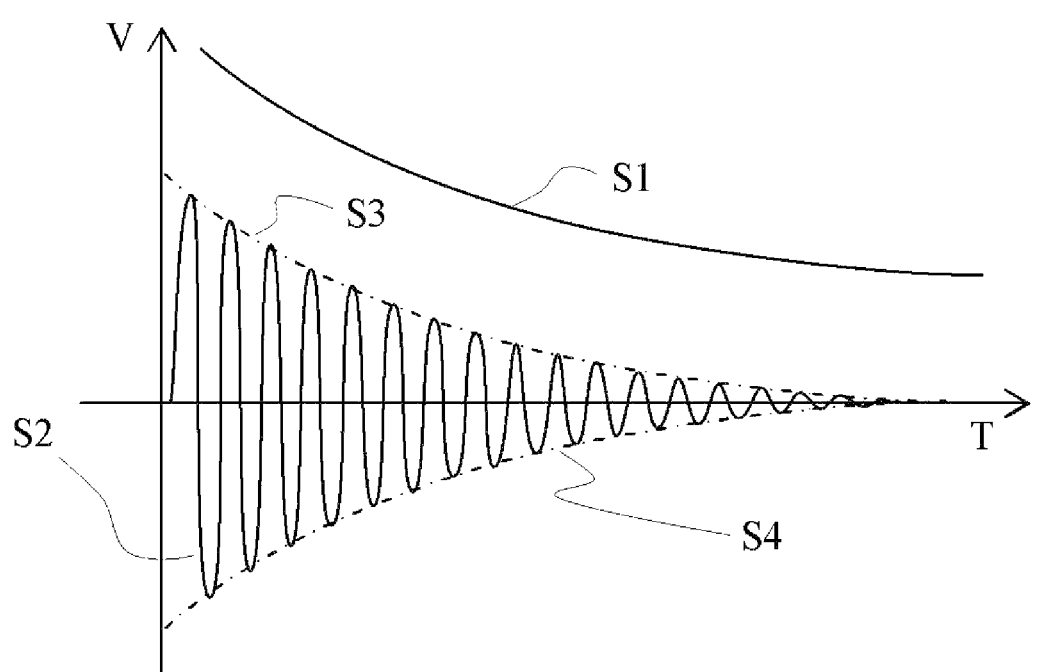
FIG. 3 is a voltage waveform diagram of the two ends of the capacitor C1 and the output of the CCFL conversion circuit in the first embodiment of the disclosure.

FIG. 3 is a voltage waveform diagram of the two ends of the capacitor C1 and the output of the CCFL conversion circuit in the first embodiment of the disclosure. The voltage waveforms at both ends of the capacitor C1 are shown as the straight line S1 in FIG. 3, which drops in an exponential manner. Under the circumstances, the voltage waveform output by the CCFL conversion circuit is as shown like the curve S2, which is a gradually attenuating high-frequency alternating current. Straight line S3 is the envelope of curve S2 in the positive half cycle, straight line S4 is the envelope of curve S2 in the negative half cycle, straight line S3 and straight line S4 are mirror-symmetrical along the X axis.

The application scheme of the power supply circuit in this embodiment in the photovoltaic power generation system is as follows:

The hot end of the photovoltaic string that needs to be activated is electrically connected to the first output terminal of the power supply circuit, and the ground end of the photovoltaic string that needs to be activated is electrically connected to the second output terminal of the power supply circuit.

When the disclosure utilizes the photovoltaic string itself to provide the operating voltage for the power supply circuit, the photovoltaic string that supplies the operating voltage and the activated photovoltaic string can be the same or different.

It should be noted that when the positive pole of the photovoltaic string is grounded, the negative pole is the hot end; when the negative pole of the photovoltaic string is grounded, the positive pole is the hot end. Both connection methods can realize the activation of the photovoltaic string.

"Electrical connection" means that in addition to direct connection, it also includes indirect connection (that is, other components can be connected between two electrically connected objects), and includes connection that is implemented through inductive coupling.

The second embodiment of the application is an indirect connection, and the following cases are also indirect connections.

When the electrolytic capacitor set with stable output voltage is connected in parallel at both ends of the activated photovoltaic string, in order to prevent the electrolytic capacitor set from absorbing the high-frequency alternating current output by the power supply circuit of the disclosure, which stops activation of the photovoltaic string, under the circumstances it is required to connect an inductor in series between the hot end of the photovoltaic string and the connection point connected to the electrolytic capacitor set. As such, the high-frequency alternating current applied to both ends of the electrolytic capacitor set can be applied to both ends of the photovoltaic string due to the isolation effect of the inductance, thereby realizing the activation of the photovoltaic string in this case. Under the circumstances, the hot end of the photovoltaic string is not directly connected to the first output terminal of the power supply circuit, but it still falls within the scope to be protected by the disclosure.

It is recommended that the activation of the photovoltaic strings in this disclosure be carried out at night every few days. The time required for activation is related to the level of aging of the photovoltaic strings, the higher the level of aging, the longer the time required. In order to achieve a better activation effect, the slower the voltage drop output by the BUCK circuit in the power supply circuit, the better, and the cumulative drop time is greater than or equal to 20 minutes.

In order to test the effect of the activation circuit, a set of photovoltaic power generation equipment with a nominal output power of only 2 KW was purchased from Taobao. The photovoltaic power generation equipment has been used for 6 years, which was originally used for supporting rural areas in the western part of the country. The actual measurement was carried out under clear weather in Guangzhou. The actual output power is only 690 W and the open circuit voltage is 377V. The power supply circuit parameters of the disclosure are that the operating voltage is the above open circuit voltage 377V, which is directly derived from the output of the photovoltaic string in the photovoltaic power generation equipment at 15:00 in the afternoon. The capacitor C1 is 2200 uF/450V and two capacitor C1 are connected in parallel. At 17:00 in the afternoon, the switch K1 is opened, at 20:00 in the evening, the switch K2 is closed, the operating frequency of the CCFL conversion circuit is 3.4 KHz, operating for only 1 minute and 43 seconds. The voltage of capacitor C1 has dropped to around 60V, the measured power generation power on the next day rose to 757 W, and it was activated again that night for 1 minute and 43 seconds. On the third day, the power generation power rose to 823 W. After 21 times of activations, it rose to 1986 W, which was close to the nominal output power. A good effect has been achieved.

In addition, since the inside of the photovoltaic string is equivalent to a constant current source, a most basic unit, and there is a PN junction diode inside it, and the diode cannot be turned on when the photovoltaic string is normally activated, otherwise the CCFL will be burned due to a current short circuit. Even if a current-limiting circuit is adopted for protection through a clever design, the electrical energy will be wasted as well. In order to ensure the safety of the photovoltaic string, the disclosure requires that the peak value of the high-frequency alternating current output by the CCFL conversion circuit should not be greater than the open circuit voltage of the activated photovoltaic string, so as to effectively prevent the diodes inside the photovoltaic string from being turned on. In addition, the higher the frequency, the better the activation effect. However, because the photovoltaic strings exhibit a certain degree of capacitance, they will also consume too much electric energy. Therefore, for photovoltaic strings of different powers, different high-frequency alternating current frequencies should be selected. Generally speaking, the larger the cell area, the larger the output power, the higher the junction capacitance of its PN junction, and the lower the frequency should be, even as low as 800 Hz. Under the circumstances, the power circuit used for activation of the disclosure consumes less energy. If the frequency is lowered, the required activation time will be longer, which will increase the power consumption.

For example, if the single cells connected in series in the photovoltaic string are the basic unit, the number of single cells is 24 (the minimum number of single cells in the photovoltaic string is required to be 24, and the obtained open circuit voltage is about 14.4V to 16.8V). Since the electrical characteristics of the photovoltaic string also follow the PN junction equation, the voltage drop of the diode is 0.7V, then the maximum open circuit voltage at both ends of the photovoltaic string is 0.7V×27=16.8V, then the peak value of the high-frequency alternating current output by the CCFL conversion circuit should be slightly lower than 16.8V to ensure the safety of the photovoltaic string. For another example, for a 600V photovoltaic string in the United States (which is composed of 1008 basic units connected in series), the activation voltage requirement is slightly lower than 600V.

Since the photovoltaic string is capacitive during activation, this junction capacitance is finally equivalent to: in parallel with the capacitor C3, and the CCFL converter operates in a sinusoidal wave resonance state, and its LC circuit can absorb the junction capacitance energy of the photovoltaic string, so as to achieve low energy consumption activation. In particular, the CCFL converter gives up the use of self-excited push-pull oscillation mode, but uses the mode of driving externally, such that the triodes TR1 or TR2 are turned on when the sinusoidal wave is close to the peak, and the conversion efficiency is higher. This is also the reason that the disclosure uses the capacitor C1 to supply power to the CCFL conversion capacitor, which can achieve the purpose of the disclosure.

Driven externally is also known as excited externally. It should be noted that the CCFL converter uses a self-excited push-pull oscillation mode. By adjusting the turns ratio of the feedback winding and the primary winding, it is also possible to realize that the triodes TR1 or TR2 is turned on when the sinusoidal wave is close to the peak value. The conversion efficiency is equally high. In order to prevent the CCFL converter from stopping oscillating when the output voltage of the BUCK circuit is low, when the resistor R1 in the startup circuit is replaced with a constant current source, then, as mentioned above, when the operating voltage drops from 377V to 60V, since the base current supplied by the constant current source to the triodes TR1 or TR2 is not reduced, the CCFL converter will not stop oscillating. This will be shown in the third embodiment.

It should be noted that, in the prior art, the conventional color television receiver using an electron gun to scan a glass kinescope adopts an attenuated sinusoidal alternating current to degauss the kinescope. Its working principle is very simple. It uses a PTC thermistor connected in series with the degaussing coil. As time goes by, the resistance of the PTC thermistor has risen from about 10 ohms to more than 220K, and the degaussing current has also dropped from more than ten amperes to less than 1 mA. However, this technology cannot be directly used for the activation of photovoltaic strings because the photovoltaic string is capacitive, and therefore PTC thermistors cannot be connected in series. Moreover, the activation time required for the photovoltaic string is long, and the PTC thermistor cannot be selected.

The Second Embodiment

Figure 4:
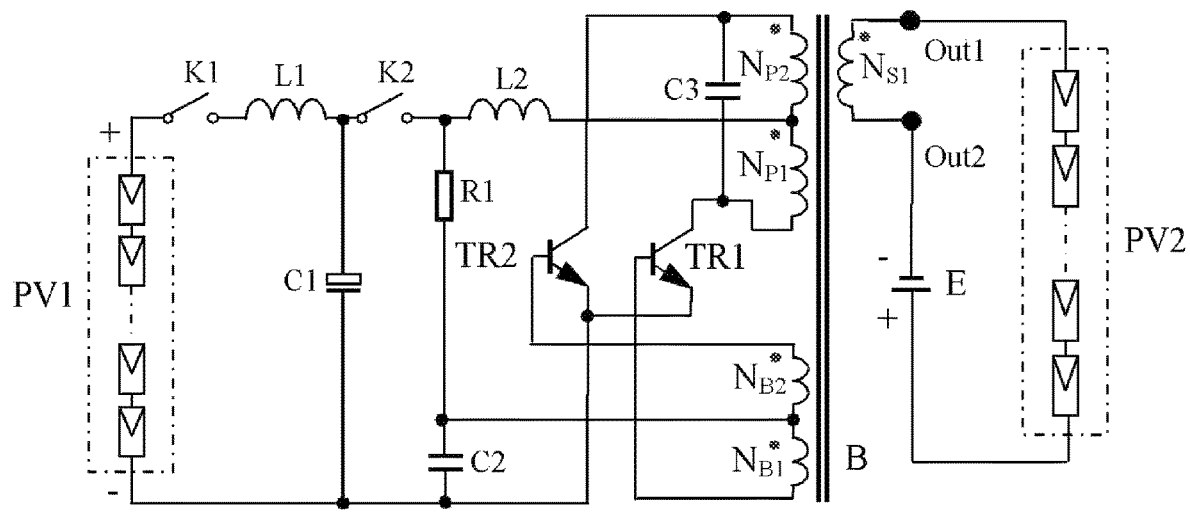
FIG. 4 is a schematic diagram showing the principle of the improved photovoltaic power generation system applied to the power supply circuit according to the second embodiment of the disclosure.

FIG. 4 is a schematic diagram showing the principle of the improved photovoltaic power generation system applied to the power supply circuit according to the second embodiment of the disclosure. Since the equivalent inside the photovoltaic string has a diode connected in series, and in order to improve the activation effect, a set of DC power supply E is connected in series at the output terminal of the power supply circuit, that is, a set of DC power supply E is connected in series with the photovoltaic string. The series connection method is one of the following two:

(1) The negative pole of the DC power supply is electrically connected to the second output terminal of the power supply circuit, the first output terminal of the power supply circuit is electrically connected to the positive pole of the photovoltaic string, and the negative pole of the photovoltaic string is electrically connected to the positive pole of the DC power supply.

(2) The negative pole of the DC power supply is electrically connected to the positive pole of the photovoltaic string, the negative pole of the photovoltaic string is electrically connected to the second output terminal of the power supply circuit, and the first output terminal of the power supply circuit is electrically connected to the positive pole of the DC power supply.

This embodiment also adopts "electrical connection" to describe the connection relationship. Similarly, "electrical connection" means not only direct connection, but also indirect connection (that is, other components may also be connected between two electrically connected objects), and includes connection that is implemented through inductive coupling, which has been described in the first embodiment.

The photovoltaic string PV1 that provides the operating voltage for the power circuit in FIG. 4 and the activated photovoltaic string PV2 may be the same photovoltaic string or different.

In this manner, the activation voltage obtained between the hot end and the ground terminal of the photovoltaic string can be an AC voltage waveform with a small positive half cycle and a negative half of the same magnitude. The small positive half cycle can ensure that the diodes inside the photovoltaic string do not conduct during activation. The negative half-week negative voltage is very high to get a better activation effect.

The Third Embodiment

Figure 5:
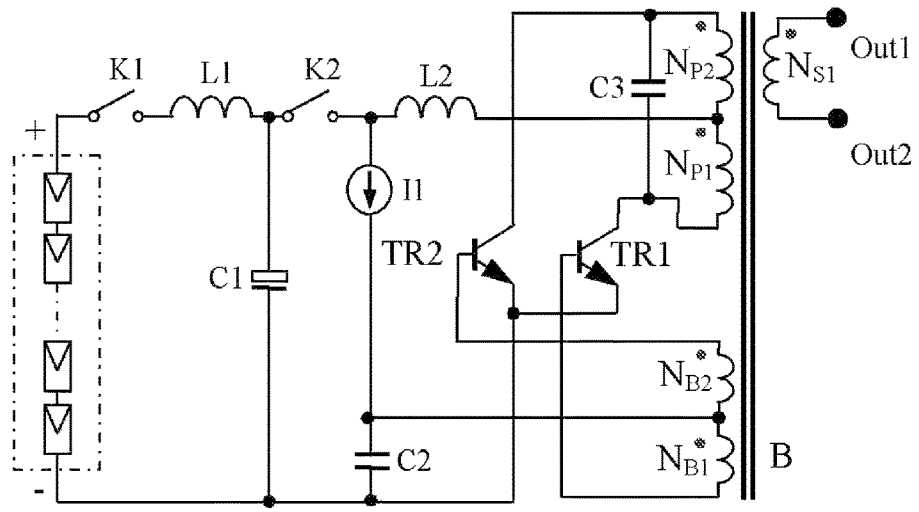
FIG. 5 is a schematic diagram showing the principle of a power supply circuit according to a third embodiment of the disclosure.

FIG. 5 is a schematic diagram showing the principle of a power supply circuit according to a third embodiment of the disclosure. The third embodiment is different from the first embodiment in that the resistor R1 is replaced with a constant current source, and the current direction is the same. In this way, when the input voltage drops, due to the presence of the constant current source, it is possible to achieve that the current supplied by the CCFL conversion circuit to the bases of the two push-pull triodes TR1 and TR2 is constantly unchanged. Therefore, the input voltage of the power supply circuit can be wider. As mentioned above, when the operating voltage drops from 377V to 60V, since the base current supplied by the constant current source to the triodes TR1 or TR2 is not reduced, the CCFL converter will not stop oscillating so as to adapt to the wide-range terminal voltage of the photovoltaic string. The working principle of this embodiment and its application in the photovoltaic power generation system are the same as in the first embodiment, and therefore no further description is incorporated herein.

The above are only the preferred embodiments of the disclosure. It should be noted that the above preferred embodiments should not be regarded as limiting the disclosure. For those of ordinary skill in the art, without departing from the spirit and scope of the disclosure, several improvements and modifications can be made, such as replacing the inductor L1 in FIG. 1 with a resistor, and connecting the other end of the capacitor C2 in FIG. 1 to one end of the resistor R1, or change the self-drive mode in FIG. 1 into driven externally under the condition that the CCFL conversion circuit operates in an open-loop mode. Further, the output voltage of the CCFL conversion circuit can be detected to control the duty of the BUCK circuit. These improvements and modifications should also be regarded as falling within the protection scope of the present disclosure, and no further embodiments will be incorporated herein. The protection scope of the disclosure should be subject to the scope defined by the claims. In addition, all the "electrical connection" and "connection" relationships involved in the disclosure do not simply refer to the direct connection of the components, but refer to the fact that an optimal connection structure can be formed by adding connection accessories according to specific implementation conditions. The explicit use of "electrical connection" in the present disclosure is only to emphasize this meaning, but it does not exclude that the use of "connection" also has the same meaning. The various technical features in the disclosure can be combined interactively under the premise of not conflicting with each other.

What is claimed is:

1. A power supply circuit applied to a photovoltaic comprising same, comprising:
a switch K1, a current-limiting device, a capacitor C1, a switch K2, and a CCFL conversion circuit; one end of the switch K1 is a positive input terminal of the power supply circuit, the other end of the switch K1 is connected to one end of the current-g device, and the other end of the current-limiting device is simultaneously connected to one end of the capacitor C1 and one end of the switch K2, the other end of the capacitor C1 is a negative input terminal of the power supply circuit, a positive input terminal of the CCFL conversion circuit is connected to the other end of the switch K2, and the negative input terminal of the CCFL conversion circuit is connected to the negative input terminal of the power supply circuit, a first output terminal of the CCFL conversion circuit is a first output terminal of the power supply circuit, and a second output terminal of the CCFL conversion circuit is a second output terminal of the power supply circuit;
when a photovoltaic string is activated, the switch K1 is opened before the switch K2, and the capacitor C1 is used to supply an operating voltage for the CCFL conversion circuit,
wherein a peak-to-peak value of an alternating current output by the CCFL conversion circuit is in direct proportion to the operating voltage.

2. The power supply circuit according to claim 1, wherein the current-limiting device is an inductor or a resistor.

3. The power supply circuit according to claim 1, wherein the capacitor C1 is a super capacitor or an electrolytic capacitor.

4. The power supply circuit according to claim 1, wherein the CCFL conversion circuit is driven externally.

5. The power supply circuit according to claim 1, wherein the CCFL conversion circuit at least comprises a startup circuit, an inductor L2, a capacitor C3, a triode TR1, a triode TR2, a transformer B, primary windings NP1 and NP2, feedback windings NB1 and NB2, and a secondary winding NS1, the startup circuit at least comprises two terminals, a startup input terminal and a startup output terminal; the startup input terminal is connected to the other end of the switch K2, and the startup output terminal is connected to center taps of the feedback windings NB1 and NB2; emitters of the triodes TR1 and TR2 are both connected to the other end of the capacitor C1, collectors are respectively connected to two terminals of the primary windings NP1 and NP2, the collectors are further respectively connected to two terminals of the capacitor C3, and bases are respectively connected to two terminals of the feedback windings NB1 and NB2; center taps of the primary windings NP1 and NP2 are connected to the other terminal of the switch K2 through the inductor L2; one end of the secondary winding NS1 is a first output terminal of the CCFL conversion circuit, and the other end of the secondary winding NS1 is a second output terminal of the CCFL conversion circuit.

6. The power supply circuit according to claim 5, wherein the startup circuit comprises a current supply device, and the current supply device is a resistor or a constant current source device.

7. The power supply circuit according to claim 6, wherein the startup circuit further comprises a capacitor C2, which is connected in parallel with the current supply device, or the capacitor C2 is connected to the startup output terminal and the other end of the capacitor C1.

8. A photovoltaic power generation system, comprising: a photovoltaic string and the power supply circuit according to claim 1, wherein a hot end of the photovoltaic string is electrically connected to the first output terminal of the power supply circuit, and a ground terminal of the photovoltaic string is electrically connected the second output terminal of the power supply circuit.

9. The photovoltaic power generation system according to claim 8, further comprising a DC power supply, and the DC power supply is connected in series with an output terminal of the power supply circuit, and the series connection method is one of the following two:

(1) a negative pole of the DC power supply is electrically connected to the second output terminal of the power supply circuit, the first output terminal of the power supply circuit is electrically connected to a positive pole of the photovoltaic string, and a negative pole of the photovoltaic string is electrically connected to a positive pole of the DC power supply;

(2) the negative pole of the DC power supply is electrically connected to the positive pole of the photovoltaic string, a negative pole of the photovoltaic string is electrically connected to the second output terminal of the power supply circuit, and the first output terminal of the power supply circuit is electrically connected to a positive pole of the DC power supply.

10. The photovoltaic power generation system according to claim 8, wherein a peak value of a high-frequency alternating current output by the CCFL conversion circuit is not greater than an open circuit voltage of the activated photovoltaic string.

11. The photovoltaic power generation system according to claim 9, wherein a peak value of a high-frequency alternating current output by the CCFL conversion circuit is not greater than an open circuit voltage of the activated photovoltaic string.

12. A photovoltaic power generation system, comprising: a photovoltaic string and the power supply circuit according to claim 2, wherein a hot end of the photovoltaic string is electrically connected to the first output terminal of the power supply circuit, and a ground terminal of the photovoltaic string is electrically connected the second output terminal of the power supply circuit.

13. The photovoltaic power generation system according to claim 12, further comprising a DC power supply, and the DC power supply is connected in series with an output terminal of the power supply circuit, and the series connection method is one of the following two:

(1) a negative pole of the DC power supply is electrically connected to the second output terminal of the power supply circuit, the first output terminal of the power supply circuit is electrically connected to a positive pole of the photovoltaic string, and a negative pole of the photovoltaic string is electrically connected to a positive pole of the DC power supply;

(2) the negative pole of the DC power supply is electrically connected to the positive pole of the photovoltaic string, a negative pole of the photovoltaic string is electrically connected to the second output terminal of the power supply circuit, and the first output terminal of the power supply circuit is electrically connected to a positive pole of the DC power supply.

14. A photovoltaic power generation system, comprising: a photovoltaic string and the power supply circuit according to claim 3, wherein a hot end of the photovoltaic string is electrically connected to the first output terminal of the power supply circuit, and a ground terminal of the photovoltaic string is electrically connected the second output terminal of the power supply circuit.

15. The photovoltaic power generation system according to claim 14, further comprising a DC power supply, and the DC power supply is connected in series with an output terminal of the power supply circuit, and the series connection method is one of the following two:

(1) a negative pole of the DC power supply is electrically connected to the second output terminal of the power supply circuit, the first output terminal of the power supply circuit is electrically connected to a positive pole of the photovoltaic string, and a negative pole of the photovoltaic string is electrically connected to a positive pole of the DC power supply;

(2) the negative pole of the DC power supply is electrically connected to the positive pole of the photovoltaic string, a negative pole of the photovoltaic string is electrically connected to the second output terminal of the power supply circuit, and the first output terminal of the power supply circuit is electrically connected to a positive pole of the DC power supply.

16. A photovoltaic power generation system, comprising: a photovoltaic string and the power supply circuit according to claim 4, wherein a hot end of the photovoltaic string is electrically connected to the first output terminal of the power supply circuit, and a ground terminal of the photovoltaic string is electrically connected the second output terminal of the power supply circuit.

17. The photovoltaic power generation system according to claim 16, further comprising a DC power supply, and the DC power supply is connected in series with an output terminal of the power supply circuit, and the series connection method is one of the following two:

(1) a negative pole of the DC power supply is electrically connected to the second output terminal of the power supply circuit, the first output terminal of the power supply circuit is electrically connected to a positive pole of the photovoltaic string, and a negative pole of the photovoltaic string is electrically connected to a positive pole of the DC power supply;

(2) the negative pole of the DC power supply is electrically connected to the positive pole of the photovoltaic string, a negative pole of the photovoltaic string is electrically connected to the second output terminal of the power supply circuit, and the first output terminal of the power supply circuit is electrically connected to a positive pole of the DC power supply.

18. A photovoltaic power generation system, comprising: a photovoltaic string and the power supply circuit according to claim 5, wherein a hot end of the photovoltaic string is electrically connected to the first output terminal of the power supply circuit, and a ground terminal of the photovoltaic string is electrically connected the second output terminal of the power supply circuit.

19. The photovoltaic power generation system according to claim 18, further comprising a DC power supply, and the DC power supply is connected in series with an output terminal of the power supply circuit, and the series connection method is one of the following two:

(1) a negative pole of the DC power supply is electrically connected to the second output terminal of the power supply circuit, the first output terminal of the power supply circuit is electrically connected to a positive pole of the photovoltaic string, and a negative pole of the photovoltaic string is electrically connected to a positive pole of the DC power supply;

(2) the negative pole of the DC power supply is electrically connected to the positive pole of the photovoltaic string, a negative pole of the photovoltaic string is electrically connected to the second output terminal of the power supply circuit, and the first output terminal of the power supply circuit is electrically connected to a positive pole of the DC power supply.

20. A photovoltaic power generation system, comprising: a photovoltaic string and the power supply circuit according to claim 6, wherein a hot end of the photovoltaic string is electrically connected to the first output terminal of the power supply circuit, and a ground terminal of the photovoltaic string is electrically connected the second output terminal of the power supply circuit.

\* \* \* \* \*